United States Patent
Wu et al.

(10) Patent No.: US 11,951,624 B2
(45) Date of Patent: Apr. 9, 2024

(54) ROBOTIC ARM SYSTEM, CONTROL METHOD THEREOF AND COMPUTER PROGRAM PRODUCT THEREOF

(71) Applicant: INDUSTRIAL TECHNOLOGY RESEARCH INSTITUTE, Hsinchu (TW)

(72) Inventors: Chien-Yu Wu, Kouhu Township (TW); Shang-Kun Li, Taichung (TW); Shu Huang, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 234 days.

(21) Appl. No.: 17/329,297

(22) Filed: May 25, 2021

(65) Prior Publication Data
US 2022/0226990 A1 Jul. 21, 2022

(30) Foreign Application Priority Data

Jan. 19, 2021 (TW) ................. 110101979

(51) Int. Cl.
*B25J 9/16* (2006.01)
*B25J 9/02* (2006.01)
*B25J 13/08* (2006.01)

(52) U.S. Cl.
CPC ............ *B25J 9/1633* (2013.01); *B25J 9/023* (2013.01); *B25J 9/1682* (2013.01); *B25J 13/082* (2013.01)

(58) Field of Classification Search
CPC ........ B25J 9/1633; B25J 9/023; B25J 9/1682; B25J 13/082; B25J 9/0084; B25J 13/085
See application file for complete search history.

(56) References Cited

U.S. PATENT DOCUMENTS 4,974,210 A * 11/1990 Lee .................... B25J 9/1682
901/45
9,220,567 B2 12/2015 Sutherland et al.
(Continued)

FOREIGN PATENT DOCUMENTS

CN 104589335 A 5/2015
CN 106584489 A 4/2017
(Continued)

OTHER PUBLICATIONS

Yan et al., Coordinated compliance control of dual-arm robot for payload manipulation:Master-slave and shared force control 2016, IEEE, pp. 2697-2702.*
(Continued)

*Primary Examiner* — Adam R Mott
*Assistant Examiner* — Sagar KC
(74) *Attorney, Agent, or Firm* — Birch, Stewart, Kolasch & Birch, LLP

(57) ABSTRACT

A robotic arm system includes first robotic arm, second robotic arm and main controller. The first robotic arm and the second robotic arm are configured to grab object. The main controller is configured to: determine whether first force vector of first force applied by the first robotic arm to the object is equal to second force vector of second force applied by the second robotic arm to the object; when the first force vector and the second force vector are not equal, obtain a first difference between the first force vector and the second force vector; and according to the first difference, change at least one of the first force applied by the first robotic arm to the object and the second force applied by the second robotic arm to the object so that the first force vector and the second force vector are equal.

11 Claims, 5 Drawing Sheets

(56) References Cited

U.S. PATENT DOCUMENTS

| | | | |
|---|---|---|---|
| 9,586,321 | B2 | 3/2017 | Maruyama |
| 9,878,751 | B1* | 1/2018 | Thorne .............. B62D 57/032 |
| 2008/0133058 | A1* | 6/2008 | Ohno .................... B25J 9/1612 |
| | | | 901/31 |
| 2013/0184869 | A1* | 7/2013 | Inazumi ............... B25J 9/1633 |
| | | | 700/260 |
| 2015/0343641 | A1* | 12/2015 | Maruyama ............. B25J 19/023 |
| | | | 901/1 |
| 2015/0359597 | A1* | 12/2015 | Gombert ............... B25J 9/0087 |
| | | | 901/8 |
| 2017/0100841 | A1* | 4/2017 | Noda ...................... B25J 9/06 |
| 2018/0043525 | A1* | 2/2018 | Su ........................ G05B 19/425 |
| 2019/0358811 | A1* | 11/2019 | Sato ..................... G05B 19/423 |
| 2021/0094185 | A1* | 4/2021 | Yun ........................ B25J 13/085 |
| 2021/0146532 | A1* | 5/2021 | Rodriguez Garcia ...................... |
| | | | B25J 9/1669 |

FOREIGN PATENT DOCUMENTS

| | | |
|---|---|---|
| CN | 108381559 A | 8/2018 |
| CN | 208215339 U | 12/2018 |
| CN | 110774280 A | 2/2020 |
| CN | 112123341 A | 12/2020 |
| TW | 201509615 A | 3/2015 |
| TW | I577515 B | 4/2017 |
| TW | I614100 B | 2/2018 |
| TW | 201830184 A | 8/2018 |

OTHER PUBLICATIONS

Yan et al., Coordinated compliance control of dual-arm robot for payload manipulation:Master-slave and shared force control 2016, IEEE, pp. 2697-2702. (Year: 2016).*

Khatib et al., "Coordination and Decentralized Cooperation of Multiple Mobile Manipulators", Journal of Robotic Systems, May 25, 1996, vol. 13, No. 11, p. 755-764.

Lasky et al., "On Force-Tracking Impedance Control of Robot Manipulators", Proceedings of the 1991 IEEE, International Conference on Robotics and Automation, Sacramento, California—Apr. 1991, p. 274-280.

Mithun et al., "Real-Time Dynamic Singularity Avoidance while Visual Servoing of a Dual-Arm Space Robot", Air, Jul. 2-4, 2015, Goa, India, total 6 pages.

Nicolis et al., "Constraint-Based and Sensorless Force Control With an Application to a Lightweight Dual-Arm Robot", IEEE Robotics and Automation Letters, Jan. 2016, vol. 1, No. 1, p. 340-347.

Samad Hayati "Hybrid Position/Force Control Of Multi-Arm Cooperating Robots", 1986 IEEE, p. 82-89.

Yan et al., "Coordinated Compliance Control of Dual-Arm Robot for Payload Manipulation: Master-slave and Shared Force Control", 2016 IEEE/RSJ International Conference on Intelligent Robots and Systems (IROS), Daejeon Convention Center, Oct. 9-14, 2016, Daejeon, Korea, p. 2697-2702.

Taiwanese Notice of Allowance and Search Report for Taiwanese Application No. 110101979, dated Aug. 20, 2021.

* cited by examiner

ROBOTIC ARM SYSTEM, CONTROL METHOD THEREOF AND COMPUTER PROGRAM PRODUCT THEREOF

This application claims the benefit of Taiwan application Serial No. 110101979, filed Jan. 19, 2021, the subject matter of which is incorporated herein by reference.

TECHNICAL FIELD

The disclosure relates in general to a robotic arm system, a control method thereof and a computer program product thereof.

BACKGROUND

The technology that uses dual robotic arms to coordinate and transport an object becomes more and more common. However, if applying force applied to the object grabbed (or held) by the dual robotic arms is uneven during transportation, it causes the problems of pulling, twisting, squeezing, etc. to occur in the object during transportation, and these problems cause deformation, damage or even falling of the object. Therefore, how to propose a technology that could resolving the problem of the uneven force applied to the object by the aforementioned dual robotic arms is one of the goals of the industry in this technical field.

SUMMARY

According to an embodiment, a robotic arm system is provided. The robotic arm system includes a first robotic arm, a second robotic arm and a main controller. The first robotic arm and the second robotic are configured to grab an object. The main controller is configured to: determine whether a first force vector of a first force applied by the first robotic arm to the object is equal to a second force vector of a second force applied by the second robotic arm to the object; when the first force vector and the second force vector are not equal, obtain a first difference between the first force vector and the second force vector; and according to the first difference, change at least one of the first force applied by the first robotic arm to the object and the second force applied by the second robotic arm to the object so that the first force vector and the second force are equal.

According to another embodiment, a control method for a robotic arm system is provided. The control method includes the following steps: determining whether a first force vector of a first force applied by a first robotic arm to an object is equal to a second force vector of a second force applied by a second robotic arm to the object; when the first force vector and the second force vector are not equal, obtaining a first difference between the first force vector and the second force vector; and according to the first difference, changing at least one of the first force applied by the first robotic arm to the object and the second force applied by the second robotic arm to the object so that the first force vector and the second force are equal.

According to another embodiment, a computer program product is provided. The computer program product is installed in a robotic arm system to execute a control method, wherein the control method includes: determining whether a first force vector of a first force applied by a first robotic arm to an object is equal to a second force vector of a second force applied by a second robotic arm to the object; when the first force vector and the second force vector are not equal, obtaining a first difference between the first force vector and the second force vector; and according to the first difference, changing at least one of the first force applied by the first robotic arm to the object and the second force applied by the second robotic arm to the object so that the first force vector and the second force are equal.

The above and other aspects of the disclosure will become better understood with regard to the following detailed description of the preferred but non-limiting embodiment (s). The following description is made with reference to the accompanying drawings.

Figure 1:
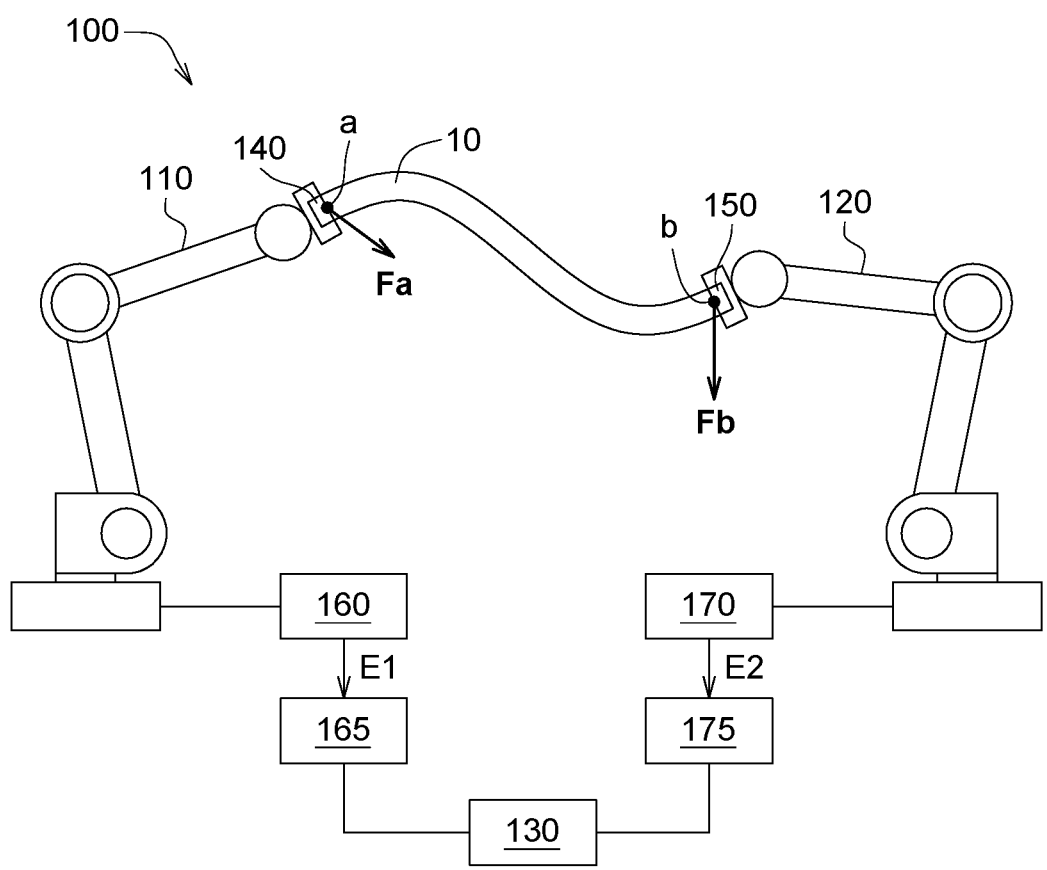
FIG. 1 shows a schematic diagram of a robotic arm system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
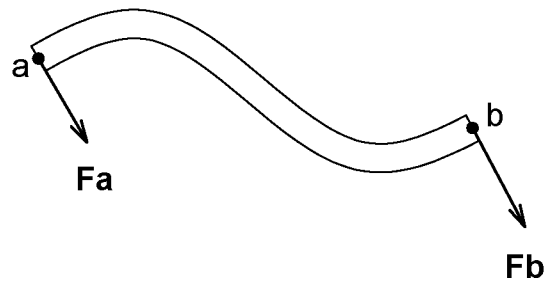
FIG. 2 shows a diagram of a forced pattern (e.g., translation) of an object clamped by the robotic arm system of FIG. 1A.
Figure 3:
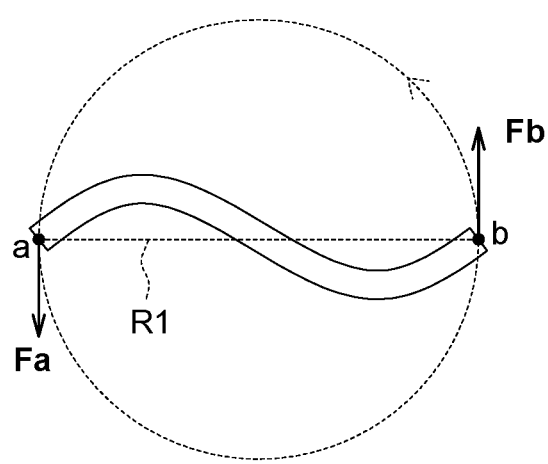
FIG. 3 shows a diagram of another forced pattern (e.g., rotation) of the object clamped by the robotic arm system of FIG. 1.

Referring to FIGS. 1 to 3. FIG. 1 shows a schematic diagram of a robotic arm system 100 according to an embodiment of the present disclosure, and FIG. 2 shows a diagram of a forced pattern (e.g., translation) of an object 10 clamped by the robotic arm system 100 of FIG. 1A, and FIG. 3 shows a diagram of another forced pattern (e.g., rotation) of the object 10 clamped by the robotic arm system 100 of FIG. 1.

The robotic arm system 100 includes a first robotic arm 110, a second robotic arm 120, a main controller 130, a first force sensor 140, a second force sensor 150, a first driver 160, a first arm controller 165, a second driver 170 and a second arm controller 175. The first robotic arm 110 and the second robotic arm 120 could jointly (or together) grab the object 10 and translate (for example, move in a straight direction) and/or rotate the object 10 to transport the object 10. As shown in FIG. 2, the first force Fa applied by the first robotic arm 110 and the second force Fb applied by the second robotic arm 120 to the object 10 are substantially in same direction and parallel to each other, and such forced pattern could translate the object 10. As shown in FIG. 3, the first force Fa applied by the first robotic arm 110 and the second force Fb applied by the second robotic arm 120 to the object 10 are in opposite directions respectively, and such forced pattern could rotate the object 10. In an embodiment, depending on the magnitude and the direction of the first force Fa and the second force Fb, the object 10 could be subjected to one of translation and rotation, or both.

In addition, as shown in FIGS. 1 to 3, the point a and the point b of the object 10 are applied force points at which the first robotic arm 110 and the second robotic arm 120 apply force to two ends of the object 10 respectively.

The main controller 130 is configured to: (1) determine whether a first force vector of the first force Fa applied by the first robotic arm 110 and a second force vector of the second force Fb applied by the second robotic arm 120 to the object 10 are equal; (2). when the first force vector is not equal to the second force vector, obtain a first difference between the first force vector and the second force vector; (3). change at least one of the first force Fa applied by the first robotic arm 110 to the object 10 and the second force Fb applied by the second robotic arm 120 to the object 10 according to the first difference so that the first force vector is equal to the second force vector. The "difference" herein refers to a result value of the subtraction operation. As a result, the main controller 130 could control the force applied by the robotic arm to the object 10 to make the first force vector be equal to the second force vector, so as to eliminate the composite of internal force in the object 10. The less the composite of internal force in the object 10 is, the less the internal stress and deformation of the object 10 are.

By the aforementioned control method, even if the object 10 is pulled, twisted, squeezed, etc. during the process of transporting the object 10 by the robotic arm system 100, the main controller 130 could change the force applied by the robotic arm to the object 10 at any time and immediately to reduce the composite of internal force. In addition, as long as the main controller 130 could control the force applied by the robotic arm to the object 10 and eliminate the composite of internal force, the present disclosure does not limit the method and/or the process of the main controller 130 controlling the force applied by the robotic arm to the object 10.

In the present embodiment, the first force sensor 140 could be disposed on the first robotic arm 110 and configured to sense the first force Fa. The information of the first force Fa sensed by the first force sensor 140 could be transmitted to the main controller 130. The second force sensor 150 is disposed on the second robotic arm 120 and configured to sense the second force Fb. The information of the second force Fb sensed by the second force sensor 150 could be transmitted to the main controller 130.

In another embodiment, the information of the first force Fa and the information of the second force Fb could be provided to the main controller 130 by the driver of the robotic arm. For example, the first driver 160 is connected to the first robotic arm 110 and configured to drive the first robotic arm 110 to move. The first arm controller 165 is electrically connected to the first driver 160 and configured to obtain the first force Fa according to feedback signal E1 from the first driver 160, and then provide the feedback signal E1 and/or the first force Fa to the main controller 130. Similarly, the second driver 170 is connected to the second robotic arm 120 and configured to drive the second robotic arm 120 to move. The second arm controller 175 is electrically connected to the second driver 170 and configured to obtain the second force Fb according to feedback signal E2 from the second driver 170, and then provide the feedback signal E2 and/or the second force Fb to the main controller 130. In the present example, the robotic arm system 100 could optionally omit the first force sensor 140 and the second force sensor 150.

Embodiment: The Situation of the Object being Translated

Figure 4:
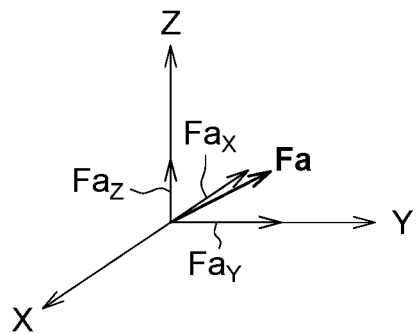
FIG. 4 shows a schematic diagram of several first force vectors of the first force of FIG. 1.
Figure 5:
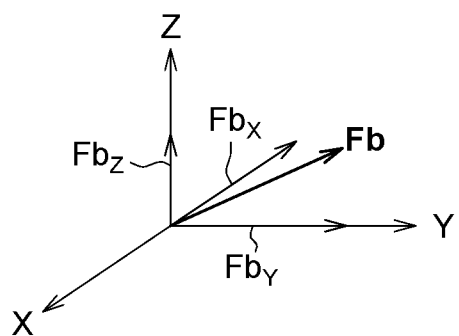
FIG. 5 shows a schematic diagram of the second force vectors of the second force of FIG. 1.
Figure 6:
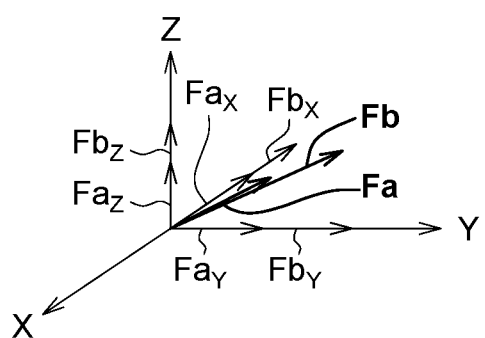
FIG. 6 shows a schematic diagram of the first force vectors and the second force vectors of FIG. 1 being mapped in a common coordinate system.

Referring to FIGS. 4 to 6, FIG. 4 shows a schematic diagram of several first force vectors $F_{aX}$, $F_{aY}$ and $F_{aZ}$ of the first force Fa of FIG. 1, and FIG. 5 shows a schematic diagram of the second force vectors $F_{bX}$, $F_{bY}$ and $F_{bZ}$ of the second force Fb of FIG. 1, and FIG. 6 shows a schematic diagram of the first force vectors $F_{aX}$, $F_{aY}$ and $F_{aZ}$ and the second force vectors $F_{bX}$, $F_{bY}$ and $F_{bZ}$ of FIG. 1 being mapped in a common coordinate system X-Y-Z.

The main controller 130 is configured to: (1) define the common coordinate system XYZ, wherein the common coordinate system XYZ has a first axis X, a second axis Y and a third axis Z that are perpendicular to each other; (2). obtain the first force vectors $F_{aX}$, $F_{aY}$ and $F_{aZ}$ of the first force Fa relative to the common coordinate system X-Y-Z, wherein the first force vector $F_{aX}$ is component of the first force Fa projected on the first axis X, the first force vector $F_{aY}$ is component of the first force Fa projected on the second axis Y, and the first force vector $F_{aZ}$ is component of the first force Fa projected on the third axis Z; (3). obtain the second force vectors $F_{bX}$, $F_{bY}$ and $F_{bZ}$ of the second force Fb relative to the common coordinate system X-Y-Z, wherein the second force vector $F_{bX}$ is component of the second force Fb projected on the first axis X, the second force vector $F_{bY}$ is component of the second force Fb projected on the second axis Y, and the second force vector $F_{bZ}$ is component of the second force Fb projected on the third axis Z; and, (4). map the first force vectors $F_{aX}$, $F_{aY}$ and $F_{aZ}$ and the second force vectors $F_{bX}$, $F_{bY}$ and $F_{bZ}$ to the common coordinate system X-Y-Z, and determine whether the first force vectors $F_{aX}$, $F_{aY}$ and $F_{aZ}$ are equal to the second force vectors $F_{bX}$, $F_{bY}$ and $F_{bZ}$ in the common coordinate system X-Y-Z.

As shown in FIG. 6, the main controller 130 is further configured to: (1) determine whether the first force vectors ($F_{aX}$, $F_{aY}$ and/or $F_{aZ}$) and the second force vectors ($F_{bX}$, $F_{bY}$ and/or $F_{bZ}$) are in the same direction; (2). obtain the first difference ΔFx between the first force vector ($F_{aX}$, $F_{aY}$ and/or $F_{aZ}$) and the second force vector $F_{bX}$; (3). when the first force vector ($F_{aX}$, $F_{aY}$ and/or $F_{aZ}$) and the second force vector $F_{bX}$ are in the same direction, control the first robotic arm 110 or the second robotic arm 120, such that the sum of the first difference ΔFx and the smaller one of the first force vector $F_{aX}$ and the second force vector $F_{bX}$ is equal to the larger one of the first force vector ($F_{aX}$, $F_{aY}$ and/or $F_{aZ}$) and the second force vector ($F_{bX}$, $F_{bY}$ and/or $F_{bZ}$). In other words, the main controller 130 could first obtain the smaller one of the first force vector ($F_{aX}$, $F_{aY}$ and/or $F_{aZ}$) and the second force vector ($F_{bX}$, $F_{bY}$ and/or $F_{bZ}$), and then obtain (or calculate) the sum of the smaller one and the first difference ΔFx, and then control the force applied by the first robotic arm 110 or the second robotic arm 120 to the object 10 for making the sum be substantially equal to the larger one of the first force vector ($F_{aX}$, $F_{aY}$ and/or $F_{aZ}$) and the second force vector ($F_{bX}$, $F_{bY}$ and/or $F_{bZ}$). In an embodiment, the aforementioned first difference is, for example, the absolute value of the difference between the first force vector and the second force vector.

Furthermore, the first force vector $F_{aX}$ greater than the second force vector $F_{bX}$ is taken for example. The main controller 130 could determine the first difference (could be regarded as adjusting the force) $\Delta Fx$ applied by the first robotic arm 110 and/or the second robotic arm 120 to the object 10 according to the following formulas (a) and (b). As shown in the following formula (b), due to the second force vector $F_{bX}$ being smaller than the first force vector $F_{aX}$, the second robotic arm 120 is controlled to apply the adjusted second force vector $F'_{bX}$ to the object 10, wherein the second force vector $F'_{bX}$ is the sum of the second force vector $F_{bX}$ and the first difference $\Delta Fx$.

$$|F_{aX}-F_{bX}|=\Delta Fx \quad (a)$$

$$F_{bX}+\Delta Fx=F'_{bX} \quad (b)$$

In another embodiment, the main controller 130 is configured to: (1) control the first robotic arm 110 or the second robotic arm 120 so that a second difference between the larger one of the first force vectors ($F_{aX}$, $F_{aY}$ and/or $F_{aZ}$) and the second force vectors ($F_{bX}$, $F_{bY}$ and/or $F_{bZ}$) and the first difference $\Delta Fx$ is equal to the smaller one of the first force vectors ($F_{aX}$, $F_{aY}$ and/or $F_{aZ}$) and the second force vectors ($F_{bX}$, $F_{bY}$ and/or $F_{bZ}$). The "difference" herein refers to a result value of the subtraction operation. In other words, the main controller 130 could first obtain the larger one of the first force vector ($F_{aX}$, $F_{aY}$ and/or $F_{aZ}$) and the second force vector ($F_{bX}$, $F_{bY}$ and/or $F_{bZ}$), and then obtain (or calculate) the difference (i.e., the second difference) between the larger one and the first difference $\Delta Fx$, and then control the force applied by the first robotic arm 110 or the second robotic arm 120 to the object 10 for making the second difference be substantially equal to the smaller one.

Furthermore, the first force vector $F_{aX}$ greater than the second force vector $F_{bX}$ is taken as example, the main controller 130 could determine the first difference $\Delta Fx$ applied by the first robotic arm 110 and/or the second robotic arm 120 to the object 10 according to the following formulas (a). As shown in the following formula (c), due to the first force vector $F_{aX}$ being larger than the second force vector $F_{bX}$, the first robotic arm 110 is controlled to apply the adjusted first force vector $F'_{aX}$ to the object 10, wherein the adjusted first force vector $F'_{aX}$ is the second difference between the first force vector $F_{aX}$ and the first difference.

$$F_{aX}-\Delta Fx=F'_{aX} \quad (c)$$

The first force vector $F_{aY}$ and the second force vectors $F_{bY}$ could be threated and the first force vector $F_{aZ}$ and the second force vectors $F_{bZ}$ could be threated using the same or similar to the aforementioned method for the first force vector $F_{aX}$ and the second force vectors $F_{bX}$, and the description is not repeated here. The main controller 130 could determine the adjustment force (e.g., the first difference) of the first robotic arm 110 and/or the second robotic arm 120 according to the aforementioned principles so that the first force vector is equal to the second force vector in the same axis to make the first force Fa and the second force Fb be equal. As a result, the first robotic arm 110 and the second robotic arm 120 could translate the object 10 at a constant speed, and thus it could reduce the compression deformation and/or the tension deformation of the object 10, or even the compression deformation and/or the tension deformation do no occur.

In summary, when the object 10 is translated, the force applied by the first robotic arm 110 and/or the second robotic arm 120 to the object 10 could be increased or reduced so that the first force Fa and the second force Fb are equal. As a result, the first robotic arm 110 and the second robotic arm 120 could translate the object 10 at a constant speed and thus it could reduce the compression deformation and/or the tension deformation of the object 10, or even the compression deformation and/or the tension deformation do no occur.

Embodiment: The Situation of the Object being Rotated

Figure 7:
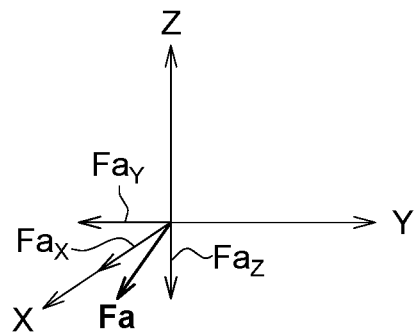
FIG. 7 shows a schematic diagram of several first force vectors of the first force of FIG. 3.
Figure 8:
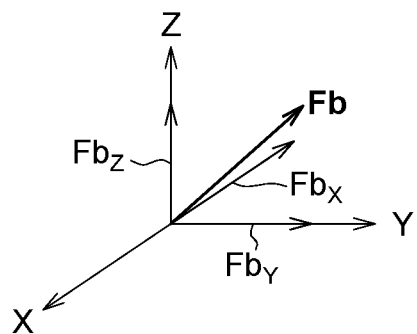
FIG. 8 shows a schematic diagram of the second force vectors of the second force of FIG. 3.
Figure 9:
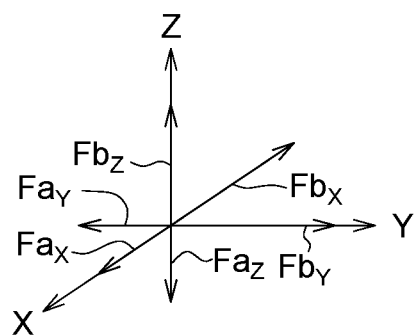
FIG. 9 shows a schematic diagram of the first force vectors and the second force vectors of FIG. 7 being mapped in the common coordinate system.

Referring FIGS. 7 to 9, FIG. 7 shows a schematic diagram of several first force vectors $F_{aX}$, $F_{aY}$ and $F_{aZ}$ of the first force Fa of FIG. 3, and FIG. 8 shows a schematic diagram of the second force vectors $F_{bX}$, $F_{bY}$ and $F_{bZ}$ of the second force Fb of FIG. 3, and FIG. 9 shows a schematic diagram of the first force vectors $F_{aX}$, $F_{aY}$ and $F_{aZ}$ and the second force vectors $F_{bX}$, $F_{bY}$ and $F_{bZ}$ of FIG. 7 being mapped in the common coordinate system X-Y-Z.

The main controller 130 is configured to: (1) define the common coordinate system XYZ, wherein the common coordinate system XYZ has the first axis X, the second axis Y and the third axis Z that are perpendicular to each other; (2). obtain the first force vectors $F_{aX}$, $F_{aY}$ and $F_{aZ}$ of the first force Fa relative to the common coordinate system X-Y-Z, wherein the first force vector $F_{aX}$ is the component of the first force Fa projected on the first axis X, the first force vector $F_{aY}$ is the component of the first force Fa projected on the second axis Y, and the first force vector $F_{aZ}$ is the component of the first force Fa projected on the third axis Z; (3). obtain the second force vectors $F_{bX}$, $F_{bY}$ and $F_{bZ}$ of the second force Fb relative to the common coordinate system X-Y-Z, wherein the second force vector $F_{bX}$ is the component of the second force Fb projected on the first axis X, the second force vector $F_{bY}$ is the component of the second force Fb projected on the second axis Y, and the second force vector $F_{b}z$ is the component of the second force Fb projected on the third axis Z; and, (4). map the first force vectors $F_{aX}$, $F_{aY}$ and $F_{aZ}$ and the second force vectors $F_{bX}$, $F_{bY}$ and $F_{bZ}$ to the common coordinate system X-Y-Z, wherein the first force vectors $F_{aX}$, $F_{aY}$ and $F_{aZ}$ are equal to the second force vectors $F_{bX}$, $F_{bY}$ and $F_{b}z$ are determined in the common coordinate system X-Y-Z.

As shown in FIG. 7, the main controller 130 is further configured to: (1) determine whether the first force vectors ($F_{aX}$, $F_{aY}$ and/or $F_{aZ}$) is opposite to the second force vectors ($F_{bX}$, $F_{bY}$ and/or $F_{bZ}$); (2). obtain the first difference $\Delta Fx$ between the first force vector $F_{aX}$ and the second force vector $F_{bX}$; (3). when the first force vector ($F_{aX}$, $F_{aY}$ and/or $F_{aZ}$) is opposite to the second force vector ($F_{bX}$, $F_{bY}$ and/or $F_{b}z$), control the first robotic arm 110 or the second robotic arm 120, such that the sum of the first difference $\Delta Fx$ and the smaller one of the first force vector ($F_{aX}$, $F_{aY}$ and/or $F_{aZ}$) and the second force vector ($F_{bX}$, $F_{bY}$ and/or $F_{bZ}$) is equal to the larger one of the first force vector $F_{aX}$ and the second force vector $F_{bX}$. In other words, the main controller 130 could first obtain the smaller one of the first force vector ($F_{aX}$, $F_{aY}$ and/or $F_{aZ}$) and the second force vector ($F_{bX}$, $F_{bY}$ and/or $F_{b}z$), and then obtain (or calculate) the sum of the smaller one and the first difference $\Delta Fx$, and then control the force applied by the first robotic arm 110 or the second robotic arm 120 to the object 10 for making the sum be substantially equal to the larger one of the first force vector ($F_{aX}$, $F_{aY}$ and/or $F_{aZ}$) and the second force vector ($F_{bX}$, $F_{bY}$ and/or $F_{bZ}$). In an embodiment, the aforementioned first difference is, for example, the absolute value of the difference between the first force vector and the second force vector.

Furthermore, the first force vector $F_{aX}$ greater than the second force vector $F_{bX}$ is taken for example. The main controller 130 could determine the first difference ΔFx applied by the first robotic arm 110 and/or the second robotic arm 120 to the object 10 according to the following formulas (d) and (e). As shown in the following formula (e), due to the second force vector $F_{bX}$ being smaller than the first force vector $F_{aX}$, the second robotic arm 120 is controlled to apply the adjusted second force vector $F'_{bX}$ to the object 10, wherein the second force vector $F'_{bX}$ is the sum of the second force vector $F_{bX}$ and the first difference ΔFx.

$$|F_{aX}-F_{bX}|=\Delta Fx \quad (d)$$

$$F_{bX}+\Delta Fx=F'_{bX} \quad (e)$$

Since the first force vector $F_{aX}$ is equal to the adjusted second force vector $F'_{bX}$, the first torque T1 (i.e., T1=R1×$F_{aX}$) generated by the cross product of a distance R1 to the first force vector $F_{aX}$ between the point a and the point b in the object 10 is equal to the second torque T2 (i.e., T2=R1×$F_{bX}$) generated by cross product of the distance R1 to the second force vector $F_{bX}$.

In another embodiment, the main controller 130 is configured to: (1) control the first robotic arm 110 or the second robotic arm 120 so that a second difference between the larger one of the first force vectors ($F_{aX}$, $F_{aY}$ and/or $F_{aZ}$) and the second force vectors ($F_{bX}$, $F_{bY}$ and/or $F_{bZ}$) and the first difference ΔFx is equal to the smaller one of the first force vectors ($F_{aX}$, $F_{aY}$ and/or $F_{aZ}$) and the second force vectors ($F_{bX}$, $F_{bY}$ and/or $F_{bZ}$). In other words, the main controller 130 could first obtain the larger one of the first force vector ($F_{aX}$, $F_{aY}$ and/or $F_{aZ}$) and the second force vector ($F_{bX}$, $F_{bY}$ and/or $F_{bZ}$), and then obtain (or calculate) the difference (i.e., the second difference) between the larger one and the first difference ΔFx, and then control the force applied by the first robotic arm 110 or the second robotic arm 120 to the object 10 for making the second difference be substantially equal to the smaller one.

Furthermore, the first force vector $F_{aX}$ greater than the second force vector $F_{bX}$ is taken as example, the main controller 130 could determine the first difference ΔFx applied by the first robotic arm 110 and/or the second robotic arm 120 to the object 10 according to the following formulas (d). As shown in the following formula (f), due to the first force vector $F_{aX}$ being larger than the second force vector $F_{bX}$, the first robotic arm 110 is controlled to apply the adjusted first force vector $F'_{aX}$ to the object 10, wherein the adjusted first force vector $F'_{aX}$ is the second difference between the first force vector $F_{aX}$ and the first difference.

$$F_{aX}-\Delta Fx=F'_{aX} \quad (f)$$

The first force vector $F_{aY}$ and the second force vectors $F_{bY}$ could be threated and the first force vector $F_{aZ}$ and the second force vectors $F_{bZ}$ could be threated using the same or similar to the aforementioned method (in the situation of the object being rotated) for the first force vector $F_{aX}$ and the second force vectors $F_{bX}$, and the description is not repeated here.

In summary, when the object 10 is rotated, the main controller 130 could determine the adjustment force applied by the first robotic arm 110 and/or the second robotic arm 120 according to the aforementioned principles so that the torque generated by the first force vector is equal to the torque generated by the second force vector. As a result, the first robotic arm 110 and the second robotic arm 120 could rotate the object 10 at a constant speed, and it could reduce the distortion of the object 10, or even the distortion do not occur.

Figure 10:
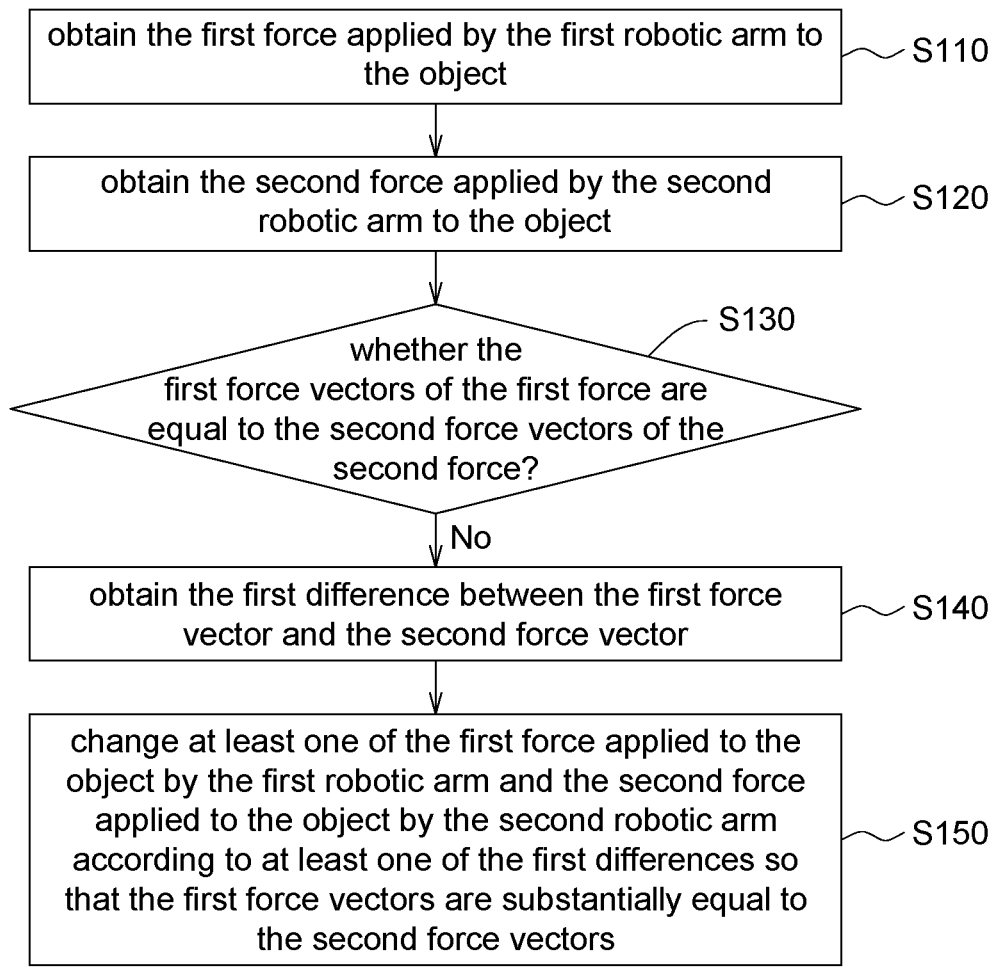
FIG. 10 shows a flow chart of one of the control methods for the robotic arm system of FIG. 1.

Referring to FIG. 10, FIG. 10 shows a flow chart of one of the control methods for the robotic arm system 100 of FIG. 1.

In step S110, the main controller 130 obtains the first force Fa applied by the first robotic arm 110 to the object 10. The information of obtaining the first force Fa could be obtained through the detection signal of the aforementioned sensor, or obtained according to the feedback signal of the driver.

In step S120, the main controller 130 obtains the second force Fb applied by the second robotic arm 120 to the object 10. The information of obtaining the second force Fb could be obtained through the detection signal of the aforementioned sensor, or obtained according to the feedback signal of the driver.

In step S130, the main controller 130 determines whether the first force vectors $F_{aX}$, $F_{aY}$ and $F_{aZ}$ of the first force Fa are equal to the second force vectors $F_{bX}$, $F_{bY}$ and $F_{bZ}$ of the second force Fb. For example, if the first force vector $F_{aX}$ is equal to the second force vector $F_{bX}$, the first force vector $F_{aY}$ is equal to the second force vector $F_{bY}$, and the first force vector $F_{aZ}$ is equal to the second force vector $F_{bZ}$, it means that the robotic arm system 100 could translate the object 10 at the constant speed or rotate the object 10 at the constant speed, and thus it could maintain the current force control. If the first force vector $F_{aX}$ is not equal to the second force vector $F_{bX}$, the first force vector $F_{aY}$ is not equal to the second force vector $F_{bY}$, and/or the first force vector $F_{aZ}$ is not equal to the second force vector $F_{bZ}$, the process proceeds to step S140.

In step S140, the main controller 130 obtains the first difference between the first force vector $F_{aX}$ and the second force vector $F_{bX}$, the first difference between the first force vector $F_{aY}$ and the second force vector $F_{bY}$, and the first difference between the vector $F_{aZ}$ and the second force vector $F_{bZ}$.

In step S150, the main controller 130 changes at least one of the first force Fa applied to the object 10 by the first robotic arm 110 and the second force Fb applied to the object 10 by the second robotic arm 120 according to at least one of the first differences so that the first force vectors $F_{aX}$, $F_{aY}$ and $F_{aZ}$ are substantially equal to the second force vectors $F_{bX}$, $F_{bY}$ and $F_{bZ}$.

The other control methods for the robotic arm system 100 in the embodiment of the present disclosure have been described above, and it will not be repeated here.

In summary, the embodiments of the present disclosure provide a robotic arm system including a first robotic arm, a second robotic arm and a main controller. The main controller could obtain the first force applied by the first robotic arm and the second force applied by the second robotic arm to the object, and accordingly adjust the first force and/or the second force to make the first robotic arm and the second robotic arm translate and/or rotates the object at the constant speed.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A robotic arm system, comprising:
   a first robotic arm configured to grab an object;
   a second robotic arm configured to grab the object; and
   a main controller configured to:
   determine whether a first force vector of a first force applied by the first robotic arm to the object is equal to a second force vector of a second force applied by the second robotic arm to the object;
   when a first magnitude of the first force vector and a second magnitude of the second force vector are not equal, obtain a first difference between the first magnitude and the second magnitude; and
   according to the first difference, change at least one of the first force applied by the first robotic arm to the object and the second force applied by the second robotic arm to the object so that the first magnitude and the second magnitude are equal;
   wherein the main controller is configured to:
   determine whether a first direction of the first force vector and a second direction of the second force vector are in opposite directions respectively, an angle difference between the first direction and the second direction is 180 degrees, and the first direction is not collinear with the second direction;
   obtain the first difference between the first magnitude and the second magnitude; and
   when the first direction and the second direction are in opposite directions respectively, control the first robotic arm or the second robotic arm so that a second difference between a larger one of the first magnitude and the second magnitude and the first difference is equal to a smaller one of the first magnitude and the second magnitude.

2. The robotic arm system according to claim 1, further comprises:
   a force sensor disposed on the first robotic arm and configured to sense the first force.

3. The robotic arm system according to claim 1, further comprises:
   a driver connected to the first robotic arm and configured to drive the first robotic arm to move; and
   a first arm controller electrically connected to the driver and configured to:
   obtain the first force according to feedback signal of the driver.

4. The robotic arm system according to claim 1, wherein the main controller is configured to:
   map the first force vector and the second force vector to a common coordinate system; and
   in the common coordinate system, determine whether the first force vector and the second force vector are equal.

5. The robotic arm system according to claim 1, the main controller is configured to:
   determine whether the first direction of the first force vector and the second direction of the second force vector are in opposite directions respectively;
   obtain the first difference between the first magnitude and the second magnitude; and
   when the first direction of the first force vector and the second direction of the second force vector are in opposite direction, control the first robotic arm or the second robotic arm so that the sum of the first difference and a smaller one of the first magnitude and the second magnitude is equal to a larger one of the first magnitude and the second magnitude.

6. A control method for a robotic arm system, comprising:
   determining whether a first force vector of a first force applied by a first robotic arm to an object is equal to a second force vector of a second force applied by a second robotic arm to the object;
   when a first magnitude of the first force vector and a second magnitude of the second force vector are not equal, obtaining a first difference between the first magnitude and the second magnitude; and
   according to the first difference, changing at least one of the first force applied by the first robotic arm to the object and the second force applied by the second robotic arm to the object so that the first magnitude and the second magnitude are equal;
   determining whether a first direction of the first force vector and a second direction of the second force vector are in opposite directions respectively, an angle difference between the first direction and the second direction is 180 degrees, and the first direction is not collinear with the second direction;
   obtaining the first difference between the first magnitude and the second magnitude; and
   when the first direction and the second direction are in opposite directions respectively, controlling the first robotic arm or the second robotic arm so that a second difference between a larger one of the first magnitude and the second magnitude and the first difference is equal to a smaller one of the first magnitude and the second magnitude.

7. The control method according to claim 6, further comprises:
   sensing the first force.

8. The control method according to claim 6, further comprises:
   obtaining the first force according to feedback signal of a driver.

9. The control method according to claim 6, further comprises:
   mapping the first force vector and the second force vector to a common coordinate system; and
   in the common coordinate system, determining whether the first force vector and the second force vector are equal.

10. The control method according to claim 6, further comprising:
    determining whether the first direction of the first force vector and the second direction of the second force vector are in opposite directions respectively;
    obtaining the first difference between the first force vector and the second force vector; and
    when the first direction of the first force vector and the second direction of the second force vector are in opposite direction, controlling the first robotic arm or the second robotic arm so that the sum of the first difference and a smaller one of the first magnitude and the second magnitude is equal to a larger one of the first magnitude and the second magnitude.

11. A non-transitory computer program product installed in a robotic arm system to execute a control method, wherein the control method comprises:
    determining whether a first force vector of a first force applied by a first robotic arm to an object is equal to a second force vector of a second force applied by a second robotic arm to the object;
    when a first magnitude of the first force vector and a second magnitude of the second force vector are not equal, obtaining a first difference between the first magnitude and the second magnitude; and according to the first difference, changing at least one of the first force applied by the first robotic arm to the object and the second force applied by the second robotic arm to the object so that the first magnitude and the second magnitude are equal;

determining whether a first direction of the first force vector and a second direction of the second force vector are in opposite directions respectively, an angle difference between the first direction and the second direction is 180 degrees, and the first direction is not collinear with the second direction;

obtaining the first difference between the first force vector and the second force vector; and when the first direction and the second direction are in opposite directions respectively, controlling the first robotic arm or the second robotic arm so that a second difference between a larger one of the first magnitude and the second magnitude and the first difference is equal to a smaller one of the first magnitude and the second magnitude.

\* \* \* \* \*